United States Patent Office 3,819,705
Patented June 25, 1974

3,819,705
QUATERNARY SALTS OF TRI-(β-PROPYLOXY-ETHYL) AMINE DERIVATIVES AND PROCESS FOR PRODUCING SAME
Yuichi Inai and Kanzo Okazaki, Tokyo; Mikio Uchiyama and Katsutoshi Shimada, Saitama and Kengo Kagei and Motoaki Besshn, Tokyo, Japan, assignors to Eisai Co., Ltd., Tokyo, Japan
No Drawing. Filed Nov. 8, 1971, Ser. No. 196,730
Claims priority, application Japan, Nov. 11, 1970, 45/98,765
Int. Cl. C07c 87/30, 93/04; A01n 9/20
U.S. Cl. 260—567.6 M     1 Claim

ABSTRACT OF THE DISCLOSURE

Novel quaternary salts of tri-(β-propyloxyethyl) amine derivatives of the formula:

$$R-N^+-(CH_2CH_2OCH_2CH_2CH_3)_3X^- \quad (I)$$

wherein R is a member selected from the group consisting of alkyl groups; aralkyl groups except benzyl group; cyclohexylalkyl groups; benzyl groups substituted by hydroxyl, alkoxy, phenoxy or benzyloxy group; benzyl groups substituted by at least two lower alkyl groups; cinnamyl group; a phenacyl group; phenoxyalkyl groups; and naphthylmethyl group; and X stands for a halogen atom
and a process for the preparation of quaternary salts of tri-(β-propyloxyethyl) amine derivatives of the above formula (I) by reacting tri(β-propyloxyethyl) amine of the formula $$N-(CH_2CH_2OCH_2CH_2CH_3)_3 \quad (II)$$

with a compound of the formula $$RX \quad (III)$$

wherein R and X are as defined above the compounds possess anti-ulcer properties.

---

This invention relates to novel quaternary salts of tri-(β-propyloxyethyl) amine derivatives, pharmaceutical compositions comprising them and a process for the preparation of said novel quaternary salts.

More specifically, the invention relates to quaternary salts of tri-(β-propyloxyethyl) amine derivatives expressed by the formula:

$$R-N^+-(CH_2CH_2OCH_2CH_2CH_3)_3X^- \quad (I)$$

wherein R is a member selected from the group consisting of alkyl groups; aralkyl groups except benzyl group; cyclohexylalkyl groups; benzyl groups substituted by hydroxyl, alkoxy, phenoxy or benzyloxy group; benzyl groups substituted by at least two lower alkyl groups; cinnamyl group; a phenacyl group; phenoxyalkyl groups; and naphthylmethyl groups; and X stands for a halogen atom.

This invention further relates to a process for the preparation of quaternary salts of tri - (β - propyloxyethyl) amine derivatives of the above formula (I) which comprises reacting tri-(β-propyloxyethyl) amine of the formula $$N-(CH_2CH_2OCH_2CH_2CH_3)_3 \quad (II)$$

with a compound of the formula $$RX \quad (III)$$

wherein R and X are as defined above.

In the definition of R in the above formula (I), the "alkyl groups" include straight or branched saturated hydrocarbon radicals having 1–10 carbon atoms, such as methyl, ethyl, n-propyl, isopropyl, pentyl, heptyl and decyl groups. By the term "aralkyl groups except benzyl group" are meant hydrocarbon radicals expressed by the formula

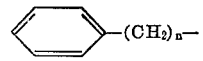

in which n is an integer of 2 to 5, such as phenethyl and phenylpentyl group. The "cyclohexylalkyl groups" designate hydrocarbon radicals expressed by the formula

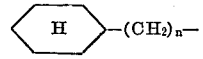

in which n is an integer of 1 to 5, such as cyclohexylmethyl and cyclohexylpentyl groups. The "benzyl groups substituted by hydroxyl group" includes benzyl groups which are substituted by hydroxyl groups in the o-, m- or p-position. The "benzyl groups substituted by alkoxy group" include benzyl groups which have as a substituent a lower alkoxy group such as methoxy, ethoxy or propyloxy in the o-, m- or p-position. The "benzyl groups substituted by benzyloxy (group) include benzyl groups which are substituted by benzyloxy group in the o-, m- or p-position. As the "benzyl groups substituted by at least two lower alkyl groups" there may be exemplified 3,5-dimethylbenzyl, 2,3,5-trimethylbenzyl, 3,4,5-trimethylbenzyl and 3,5-diethylbenzyl groups. The "phenoxyalkyl groups" include hydrocarbon radicals expressed by the formula

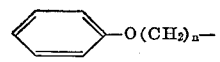

in which n is an integer of 2 to 5, such as phenoxyethyl and phenoxypentyl groups.

It has been known in the art that benzyl-tri-(β-propyloxyethyl) ammonium iodide, which has a similar structure to those of compounds of this invention, exhibits a preventive effect against the development of gastric ulcer. Although this known compound is meritorious in that it exhibits hardly any anti-cholinergic effect and does not cause such side-effects as constipation and dryness of mouth, its anti-ulcer activity is still insufficient.

The primary object of this invention is to provide useful anti-ulcerative compounds, pharmaceutical compositions containing them and a process for the preparation thereof.

Excellent medicinal properties of the novel compounds of the invention will be readily understood from the results of animal experiments which are detailed hereinbelow.

Samples Tested

Para-phenoxybenzyl-tri-(β-propyloxyethyl) ammonium bromide was selected as a typical compound of this invention and its effect as an anti-ulcer agent was evaluated by the method described below. As a comparative sample there was chosen benzyl-tri-(β-propyloxyethyl) ammonium bromide which is included in compounds disclosed in the specification of British Pat. No. 1,025,160. The former compound is designated as "Compound A" and the latter compound is designated as "Compound B."

Preparation of Test Solutions

Since both the Compound A and Compound B are insoluble in water, each of them was dissolved in an amount of 5 mg. into 1 ml. of 5% aqueous ethanol.

Method

Procedure: The test was carried out by the method of H. Shay et al. [Gastroenterology, vol. 5, page 43 (1945)]. Thus, after male rats of Wister strain having a body weight of 150–180 g. were fastened for 48 hours, their pylori were ligated. Just after the above procedure, the test solution was subcutaneously administered. After fasting for a further period of 18 hours, abdomina of the rats were cut again under chloroform anesthesia, and their stomachs were removed.

Observation of Ulcer

Under stereoscopic microscope, there were observed the degree of ulcer and the mocosa of the stomach.

Test on Gastric Juice

The whole of the gastric juice was collected and the volume was measured with the messcylinder. Then, the collected gastric juice was centrifuged at a rate of 2500 r.p.m. for 10 minutes. Then 5 ml. of the supernatant liquid was removed and its pH was determined. It was titrated with 0.1N NaOH solution until the pH reached 7.4. Thus, the concentration of hydrochloric acid in the gastric juice was calculated from the amount of the NaOH consumed for the titration.

Pepsin Activity

The pepsin activity was estimated with the method or Bonfils S. M. Durrasquet et al. [Rev. Fronce et Udes Clin et Bil, vol. 5, page 71 (1960)].

Thus, the gastric juice was diluted to 20 times with an aqueous HCl solution (to pH 1.6). Then, 2.0 ml. of the diluted solution and 1.0 ml. of 3% solution of dried human plasma whose pH was adjusted to 1.6 were mixed, and incubated exactly at 37° C., for 30 minutes. The amount of tyrosine formed by decomposition of the human plasma was measured at 275 m$\mu$ with a Spectrophotometer. The pepsin activity was expressed in terms of the amount of tyrosine formed.

Results

Results of the above tests are shown in Tables 1 and 2.

TABLE 1

Effects of Compound A and Compound B on ulcer development in pylorus ligated rats (subcutaneous administration)

| | Dose (mg./kg.) | Number of— | | | |
| --- | --- | --- | --- | --- | --- |
| | | Rats tested | Dead rats | Rupture* | No ulcer rats** |
| Compound: | | | | | |
| A | 5 | 4 | 0 | 0 | 1/4 |
| A | 10 | 5 | 0 | 0 | 4/5 |
| B | 5 | 5 | 2 | 0 | 1/3 |
| B | 10 | 4 | 3 | 1 | 0/1 |
| Control: | | | | | |
| I[1] | | 8 | 3 | 1 | 0/5 |
| I[2] | | 5 | 1 | 1 | 0/4 |

[1] In control I, rats which underwent ligation of pylorus and subcutaneous injection of 0.2 ml./100 g. of 5% alcohol were tested.
[2] In control II, rats which underwent only ligation of pylorus were tested.
*The column "rupture" indicates the number of rats in which the contents of the stomach were scattered intraperitoneal because of rupture on the ulcerated portion but which were still alive.
**The value of the denominator in the column indicates the number of rats that survived and the value of the numerator indicates the number of rats on whose stomach no ulcer was developed.

Test on Gastric Juice Secretion Inhibiting Activity in Gastric Mucosa of Frog and Test on Anti-Cholinergic Effect in Isolated Small Intestine of Rat The test on gastric juice secretion inhibiting activity in gastric mucosa was conducted in accordance with the method of C. A. M. Hogben (American Journal of Physiology, vol. 180, page 641 (1955)). As a result it was confirmed that the administration of typical compounds of this invention, that is, n-butyl-tri-($\beta$-propyloxyethyl) ammonium iodide and p-methoxybenzyl-tri-($\beta$-propyloxyethyl) ammonium bromide, each in an amount of 500$\gamma$, inhibited the gastric juice secretion in gastric mucosa of a frog administered with 10$\gamma$ of tetragastrin. In the pharmacological test using isolated small intestines of rats, administration of the above two compounds of this invention, each in an amount of 100$\gamma$, did not exhibit any anti-cholinergic effect against the administration of 1$\gamma$ of acetylcholine.

It is known that anti-cholinergic substances heretofore used as anti-ulcer agents have side-effects such as constipation and dryness of mouth. Accordingly, it will be readily understood that the compounds of this invention are effective and useful as anti-ulcer agents. *Acute Toxicity* (Male DD mice having a body weight of 19±2 g.).

p-Phenoxybenzyl-tri-($\beta$-propyloxyethyl) ammonium bromide:
  $LD_{50}$ (p.o.)=840 mg./kg. (1344–600 mg./kg.)
  $LD_{50}$ (i.p.)=19 mg./kg. (20.8–17.3 mg./kg.)
2-Naphthylmethyl-tri-($\beta$-propyloxyethyl) ammonium bromide:
  $LD_{50}$ (p.o.)=515 mg./kg. (609–430 mg./kg.)
  $LD_{50}$ (i.p.)=38 mg./kg. (46.7–30.8 mg./kg.)

Novel tri-($\beta$-propyloxyethyl) amine quaternary salts of this invention may be prepared by reacting tri-($\beta$-propyloxyethyl) amine of the above formula (II) with at least an equivalent amount of a halogen compound of the above formula (III) in an inert solvent at a temperature ranging from room temperature to the reflux temperature of the reaction mixture. As inert solvents, acetone and lower alcohols such as ethyl alcohol are preferable. After the completion of the reaction, the desired product may be isolated by conventional methods such as removal of solvent by distillation.

The process of the synthesis of compounds of this invention will now be detailed by referring to Examples.

EXAMPLE 1

Synthesis of cinnamyl-tri-($\beta$-propyloxyethyl) ammonium bromide

To a solution of 20 g. of tri-($\beta$-propyloxyethyl) amine in 70 ml. of ethyl alcohol was added 14.3 g. of cinnamyl bromide, and the mixture was refluxed for 3 hours. Then ethyl alcohol was distilled off, and the residue was washed with diethyl ether to obtain 13.5 g. of crude crystals.

TABLE 2

Effects of Compound A and Compound B on amount, pH, HCl concentration and pepsin activity of gastric juice in pylorus ligated rats

| | Dose, mg./kg. | Number of rats tested | Volume of gastric juice (ml.) | pH of gastric juice | HCl concentration (mEg./ml.) | Pepsin activity (tyrosine amount, mg./ml.) |
| --- | --- | --- | --- | --- | --- | --- |
| Compound: | | | | | | |
| A | 5 | 4 | 14.0±2.0 | 1.42±0.11 | 0.078±0.022 | 10.14±1.04 |
| A | 10 | 5 | 3.7±2.4 | 1.81±0.73 | 0.078 | 11.31±2.56 |
| B | 5 | 3 | 11.0+3.5 | 1.50±0.20 | 0.081±0.015 | 9.27±3.48 |
| B | 10 | 1 | | | | |
| Control: | | | | | | |
| I | | 5 | 13.9±2.1 | 1.50±0.22 | 0.065±0.018 | 8.84±1.20 |
| II | | 4 | 12.1±1.6 | 1.50±0.18 | 0.085 | 9.88±1.24 |

From the results shown in the above Tables 1 and 2, it is seen that the Compound A (para-phenoxybenzyl-tri-($\beta$-propyloxyethyl) ammonium bromide) has an excellent anti-ulcer activity over the Compound B, while the former Compound A imposes hardly any influences on the pH, hydrochloric acid concentration and pepsin activity of gastric juice.

The crude crystals were recrystallized from ethyl acetate to obtain 11.5 g. of cinnamyl-tri-($\beta$-propyloxyethyl) ammonium bromide melting at 119–120° C. The yield was 33%. The results of the elementary analysis of the product as $C_{24}H_{42}O_3NBr$ are as follows:
  Calculated: C=61.00, H=8.96, N=2.96. Found: C=61.03, H=9.03, N=3.09.

EXAMPLE 2

Synthesis of 2-naphthylmethyl-tri-(β-propyloxyethyl) ammonium bromide

To a solution of 25 g. of tri-(β-propyloxyethyl) amine in 150 ml. of ethyl alcohol was added 20 g. of β-bromomethyl-naphthalene, and the mixture was refluxed for 4 hours. After the termination of the reaction, ethyl alcohol was distilled off, and the residue was crystallized by the addition of n-hexane and washed with diethyl ether to obtain 37 g. of crude crystals. The crude crystals were recrystallized from acetone-isopropyl ether to obtain 27 g. of β-naphthylmethyl-tri-(β-propyloxyethyl) ammonium bromide melting at 110° C. The yield was 60%. The results of the elementary analysis of the product as $C_{26}H_{42}O_3NBr$ are as follows:

Calculated: C=62.89, H=8.53, N=2.82. Found: C=62.84, H=8.54, N=2.90.

EXAMPLE 3

Synthesis of p-phenoxybenzyl-tri-(β-propyloxyethyl) ammonium bromide

To a solution of 30 g. of tri-(β-propyloxyethyl) amine in 180 ml. of ethyl alcohol was added 20 g. of p-phenoxybenzyl bromide, and the mixture was refluxed for 3 hours. Then the ethyl alcohol was distilled off, and residue was washed with diethyl ether. The resulting crude crystal was recrystallized from ethylalcohol ethyl acetate to obtain 27 g. of p-phenoxybenzyl-tri-(β-propyloxyethyl) ammonium bromide. The yield of the product was 46% and the product had a melting point of 133.4° C. The results of the elementary analysis of the product as $C_{28}H_{44}O_4NBr$ are as follows:

Calculated: C=62.44, H=8.23, N=2.60. Found: C=62.43, H=8.19, N=2.51.

EXAMPLES 4–19

Tris-(β-propyloxyethyl) amine of the above formula (II) was reacted with various compounds of the above formula (III) in the same manner as described in Example 1. Resulting compounds are shown in Table 3.

TABLE 3.—PRODUCT I $$R-N^+-(CH_2CH_2OCH_2CH_2CH_3)_3X^-$$

| Example | R | X | Molecular Formula | Weight | Calculated/Found C | H | N | Melting point, °C. |
|---|---|---|---|---|---|---|---|---|
| 4 | $CH_3-(CH_2)_2-$ | I | $C_{18}H_{40}O_3NI$ | 445.44 | 48.52/48.73 | 9.05/8.95 | 3.15/3.39 | 86–87 |
| 5 | $CH_3-(CH_2)_3-$ | I | $C_{19}H_{42}O_3NI$ | 459.47 | 49.65/49.98 | 9.21/9.35 | 3.05/3.20 | 116–117 |
| 6 | $CH_3-(CH_2)_4-$ | I | $C_{20}H_{44}O_3NI$ | 473.50 | 50.73/50.67 | 9.37/9.35 | 2.96/2.85 | 145 |
| 7 | $CH_3-(CH_2)_5-$ | I | $C_{21}H_{46}O_3NI$ | 487.52 | 51.74/51.85 | 9.51/9.53 | 2.87/2.94 | 148 |
| 8 | $CH_3-(CH_2)_6-$ | I | $C_{22}H_{48}O_3NI$ | 501.55 | 52.68/52.80 | 9.65/9.64 | 2.79/2.59 | 133 |
| 9 | phenyl-CH$_2$- | I | $C_{22}H_{40}O_3NI$ | 499.53 | 52.89/52.72 | 9.28/9.53 | 2.80/3.12 | 105–106 |
| 10 | phenyl-CH$_2$CH$_2$- | I | $C_{23}H_{42}O_3NI$ | 507.50 | 54.43/54.42 | 8.34/8.29 | 2.76/2.88 | 116 |
| 11 | phenyl-CO-CH$_2$- | Br | $C_{23}H_{40}O_4NBr$ | 474.49 | 58.22/58.30 | 8.50/8.42 | 2.95/2.75 | 133 |
| 12 | phenyl-O-CH$_2$CH$_2$- | I | $C_{23}H_{42}O_4NI$ | 523.50 | 52.77/52.70 | 8.09/7.97 | 2.68/2.90 | 78 |
| 13 | $CH_3O-$phenyl-$CH_2-$ | Br | $C_{23}H_{42}O_4NBr$ | 476.51 | 57.97/57.85 | 8.89/8.85 | 2.94/3.07 | 97 |
| 14 | $C_2H_5O-$phenyl-$CH_2-$ | Br | $C_{24}H_{44}O_4NBr$ | 490.537 | 58.76/58.78 | 9.04/8.92 | 2.85/2.92 | 99–100 |
| 15 | $C_3H_7O-$phenyl-$CH_2-$ | Br | $C_{25}H_{46}O_4NBr$ | 504.57 | 59.51/59.40 | 9.19/9.13 | 2.77/2.90 | 92–93 |
| 16 | $C_4H_9O-$phenyl-$CH_2-$ | Br | $C_{26}H_{48}O_4NBr$ | 518.59 | 60.22/60.19 | 9.33/9.24 | 2.70/2.77 | 97–98 |
| 17 | phenyl-$CH_2O-$phenyl-$CH_2-$ | Br | $C_{29}H_{46}O_4NBr$ | 552.6 | 63.03/62.90 | 8.39/8.32 | 2.53/2.55 | 110–111 |
| 18 | 1-naphthyl-$CH_2-$ | Br | $C_{26}H_{42}O_3NBr$ | 496.55 | 62.89/63.06 | 8.53/8.12 | 2.82/3.10 | 90 |
| 19 | 2,6-dimethylphenyl-$CH_2-$ | Br | $C_{24}H_{44}O_3NBr$ | 474.53 | 60.74/60.35 | 9.35/9.11 | 2.96/3.00 | 119 |

Compounds of this invention are formulated in the form of a suspension for injection, tablets, sugar-coated pills, film-coated tablets, powders, capsules, etc.

These formulations and preparations containing compounds of this invention may be formed by conventional methods. A daily dose of 300–3000 mg. is preferable for the oral administration, and 50–500 mg. for the parenteral administration.

Typical instances of the formulations containing compounds of this invention will now be detailed by the following Examples.

EXAMPLE 20

Preparation of suspension for subcutaneous injection

|  | G. |
|---|---|
| p-Phenoxybenzyl-tri-(β-propyloxyethyl) ammonium bromide | 50.0 |
| Tween 80 | 10.0 |
| C.M.C.-Na | 10.0 |
| Distilled water to 1.0 l. | |

To a mixture of 50.0 g. of p-phenoxybenzyl-tri-(β-propyloxyethyl) ammonium bromide and 10 g. of Tween 80 was added distilled water (300 ml.), and they were homogeneously kneaded by vigorous agitation. A solution of 10 g. of sodium carboxy-methyl cellulose in 300 ml. of distilled water was added under agitation to the kneaded mixture. Distilled water was added to the resulting mixture in an amount sufficient to obtain 1 liter of suspension. The suspension was poured into 1000 ampoules. Each ample contains 50 mg./ml. of the compound of this invention.

EXAMPLE 21

Preparation of tablets

|  | G. |
|---|---|
| p-Phenoxybenzyl-tri-(β-propyloxyethyl)ammonium bromide | 50.0 |
| Lactose | 58.5 |
| Microcrystalline cellulose | 35.0 |
| Hydroxypropyl starch | 25.0 |
| Magnesium stearate | 1.5 | p-Phenoxybenzyl-tri-(β-propyloxyethyl) ammonium bromide, lactose, microcrystalline cellulose, hydroxypropyl starch and magnesium stearate were blended well to obtain a homogeneous mixture. The mixture was compressed into tablets, each weighing 170 mg., with the use of a flat punch of 8 mm. diameter. Each tablet contains 50 mg. of the compound of this invention.

EXAMPLE 22

Preparation of capsules

|  | G. |
|---|---|
| 2-Naphtylmethyl-tri-(β-propyloxyethyl) ammonium bromide | 50.0 |
| Lactose | 218.5 |
| Calcium stearate | 1.5 |

2-Naphtylmethyl-tri-(β-propyloxyethyl) ammonium bromide, lactose and calcium stearate were blended well to form a homogeneous mixture. The resulting mixture was filled into 1000 gelatin capsules. Each capsule contains 50 mg. of the compound of this invention.

What is claimed is:

1. Para-phenoxybenzyl-tri-(β - propyloxyethyl) ammonium bromide.

References Cited

UNITED STATES PATENTS 3,372,194   3/1968   Arnkjaer et al. __ 260—567.6 M

FOREIGN PATENTS 1,025,160   4/1966   Great Britain.

LEON ZITVER, Primary Examiner

D. B. SPRINGER, Assistant Examiner

U.S. Cl. X.R.

424—316